United States Patent Office 3,365,614
Patented Jan. 23, 1968

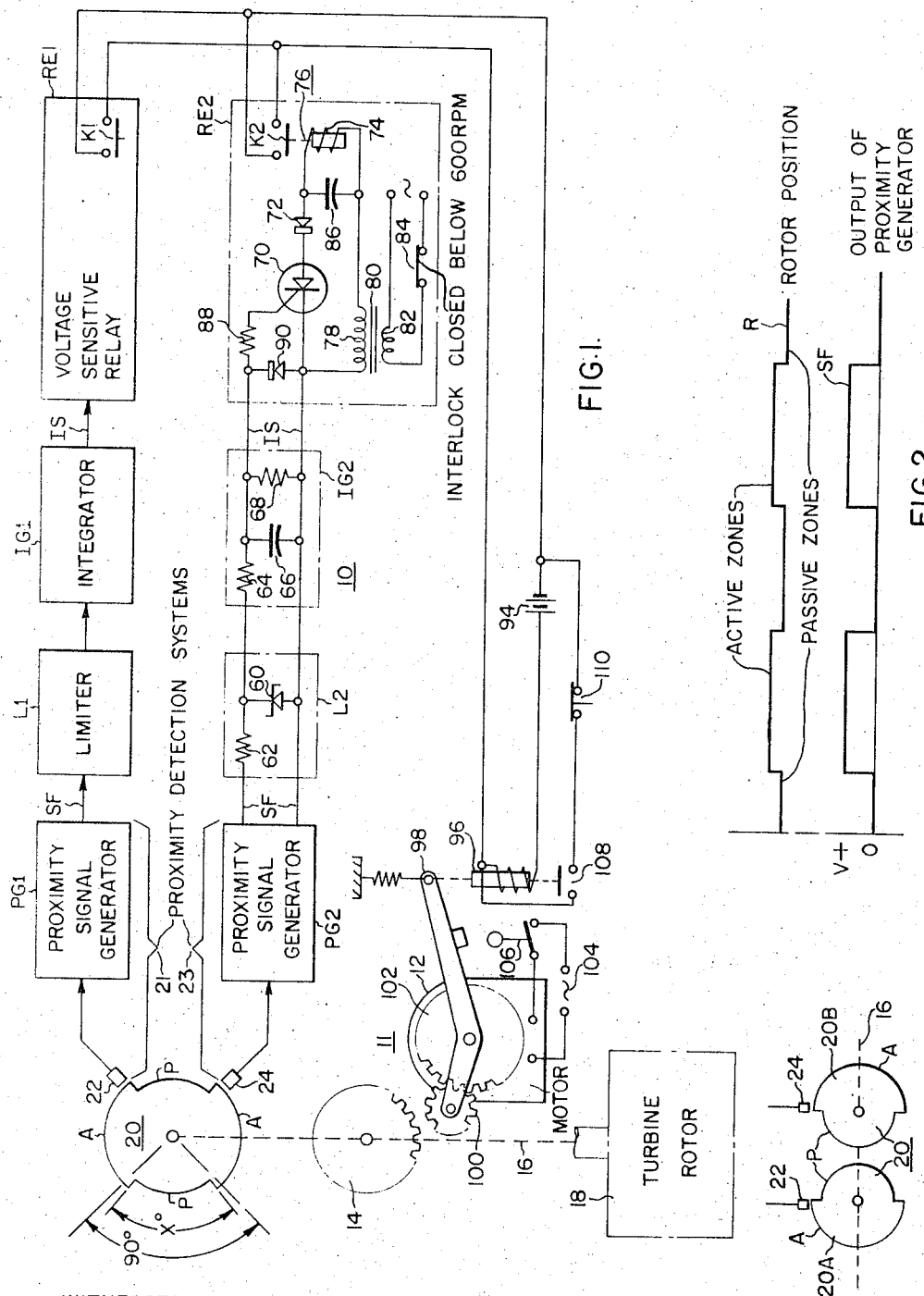

3,365,614
APPARATUS FOR DETECTING SUBSTANTIALLY ZERO SPEED OF A ROTATABLE DEVICE
Michael C. Luongo, Brookhaven, and Millard F. Smith, Philadelphia, Pa., assignors to Westinghouse Electric Corporation, Pittsburgh, Pa., a corporation of Pennsylvania
Filed May 6, 1965, Ser. No. 453,737
7 Claims. (Cl. 317—5)

This invention relates to apparatus for detecting substantially zero speed of a rotatable device, "substantially zero speed" being a condition of rest or very slow rotation relative to normal operating speed. Apparatus of this type is generally known in the art as "zero speed" apparatus.

Zero speed apparatus is generally employed to detect very slow rotation of a decelerating shaft and/or when such a shaft comes to rest or assumes zero speed.

As is known in the art relating to turbines driven by hot motive fluid, such as steam for example, after the motive fluid supply is terminated to shutdown the turbine, the turbine rotor or shaft is turned slowly by a turning gear for a period of time sufficient to assume uniform cooling of the rotor and prevent bowing of the shaft. The turning gear is preferably automatically energized in response to a signal indicative of the condition of rest or very slow rotation of the shaft, which signal is provided by the zero speed apparatus. One such arrangement is described and claimed in R. W. Le Gates and M. Csanady Patent 2,982,902, issued May 2, 1961, and assigned to the same assignee as this invention. The above patented arrangement is primarily intended for actuation by hydraulic fluid, and is highly effective and dependable in practice and has proven itself quite rugged.

However, there are occasions when a supply of hydraulic fluid is not readily available or it is undesirable to employ hydraulic apparatus. For example, the above hydraulic zero speed detecting apparatus is not inexpensive and is difficult to apply to existing turbines in the field.

Acordingly, it is a primary object of the invention to provide zero speed apparatus that employs electrical components and circuitry in a new and improved manner.

Another object is to provide electrical zero speed sensing apparatus that provides an electrical signal at substantially zero speed of a monitored shaft which signal can be employed to automatically actuate turning gear and initiate automatic slow rotation of the shaft.

Still another object is to provide zero speed detecting apparatus of the above type that lends itself to economies in manufacture and that can be applied to existing machines as well as to machines during fabrication.

The above objects may be realized in accordance with one embodiment of the invention wherein there is provided a pair of electronic signal generating systems each of which in response to shaft rotation produces intermittent electrical signals as the shaft rotates, the dwell time of each signal increasing as the shaft speed decreases, and the arrangement being such that in any given angular position of the shaft at least one of the signal generating systems will produce an output signal, so that when the shaft is at rest an output signal is assured. An electronic integrator is connected to the output of each signal generating system ot integrate, with respect to time, the shaft signals generated thereby. The time constant of each integrator is arranged to be too long to produce an integration signal great enough to operate a utilization circuit when the shaft speed is above a predetermined low order value. However the time constant of each integrator is made short enough to produce an integration signal great enough to operate the utilization circuit when the shaft speed drops to said predetermined value. The utilization circuit may for example be an indicator or a circuit for coupling a drive motor to a turning gear on the shaft of a turbine.

Other and further objects and advantages will become apparent from the following detailed description taken in conjunction with the drawings wherein a preferred embodiment of the invention is illustrated in connection with the automatic coupling of a drive motor to the turning gear on a steam turbine in response to the turbine rotation dropping to substantially zero speed.

In the drawings:

FIGURE 1 is a diagram of a zero speed apparatus embodying the invention;

FIG. 2 is a chart showing the dwell times of the signals generated by the proximity signal generator as related to the detectable toothed wheel;

FIG. 3 illustrates an alternative form of a detectable rotatable device which may be employed in the arrangement of FIG. 1;

Figure 4:
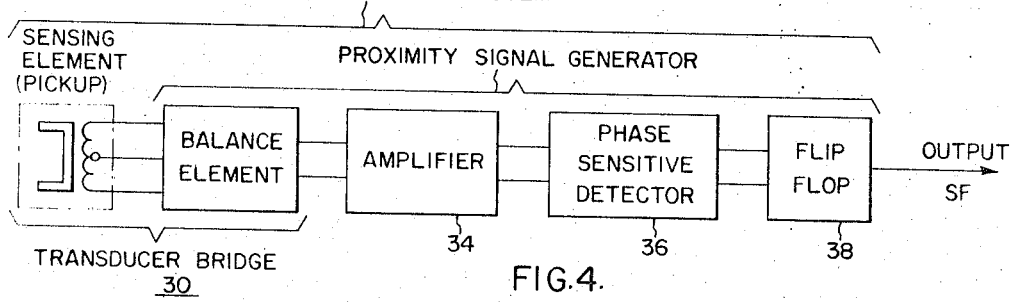
FIG. 4 is a block diagram of one example of a proximity signal generator and associated pickup which may be employed as a proximity detection system in the arrangement of FIG. 1.

As seen in FIG. 1 a zero speed apparatus 10 is utilized to automatically couple a drive motor 12 to a turning gear 14 keyed to the shaft 16 of a steam turbine rotor 18. The system is arranged to couple the motor to the turning gear only at a safe turbine shaft speed, that is at a sufficiently slow speed to prevent damage to the coupling gears.

The zero speed apparatus 10 includes a rotatable detectable device 20 coupled to the shaft 16 for rotation therewith, and having alternately disposed active A and passive P zones succeeding one another around at least one path of revolution of the device. A pair of electric pickup devices (sensing devices) 22 and 24 arranged to scan the detectable device 20, significantly sense the active zones A when exposed thereto, while not significantly sensing the passive zones P when exposed thereto.

Pickup 22 is connected to an electric proximity signal generator PG1 to form an electric proximity detection system 21. The signal generator PG1 may be of any suitable type which will provide an electric output signal every time and as long as pickup 22 is exposed to (being within detection or sensing range of) an active zone A. Similarly, pickup 24 is connected to a proximity signal generator PG2 (similar to PG1) to form a second proximity detection system 23. Since the output signal produced by each of the proximity detection systems 21 and 23 is a function of the speed of rotor 20, the output signal of each of the proximity signal generators PG1 and PG2 may be referred to as a "speed function" signal as indicated by the reference character SF applied to the output lines of proximity signal generators PG1 and PG2.

An example of a desirable output of a proximity detection system is shown in FIG. 2 wherein the output SF of a proximity generator is shown for every position of the rotor 20 relative to the pickup device attached to the signal generator. In FIG. 2, curve SF is the output of the proximity generator, while curve R is a development of the rotor 20 periphery. It will be seen from FIG. 2 that the dwell times of the voltage signals produced by the proximity generator are coextensive with the length of exposure of the pickup to an active zone.

The pickups are referred to as electric pickups because they sense the presence of an active zone A by undergoing a significant change in an electrical characteristic, for example impedance change, when exposed to an active zone A. The impedance change may be direct as by change of inductance or capacitance, or indirect as by introducing loading or losses such as would occur when conductive material is brought close to a winding carrying alternating current. The electric proximity signal generator connected to each pickup needs only to be an electric device or system which will produce an output signal in response to and so long as the pickup suffers the significant change in the electrical characteristic as a result of exposure to an active zone A.

Figure 5:
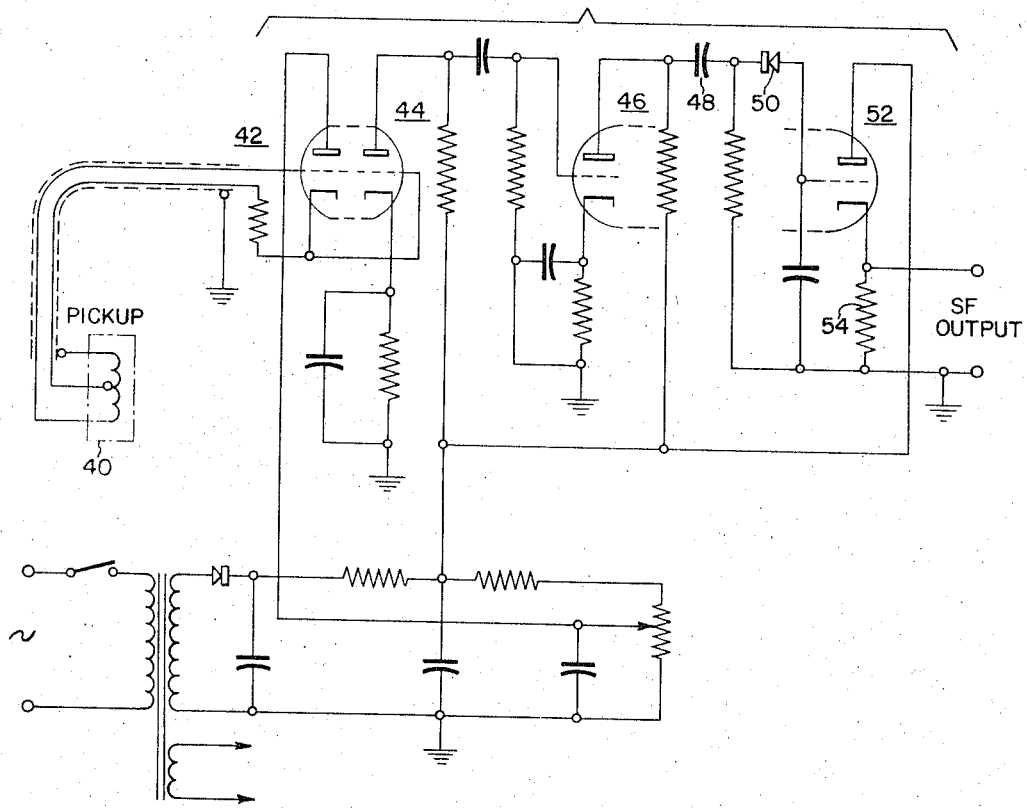
FIG. 5 is a schematic diagram of another example of a proximity signal generator and associated pickup which may be used as a proximity detection system arrangement of FIG. 1.

By way of example the detachable device 20 is shown as a toothed ferromagnetic rotor for use with inductive impedance type pickups such as the examples shown in the proximity detection systems illustrated in FIGS. 4 and 5, either of which may be employed in place of each of the proximity detection systems 21 and 23 in the circuit of FIG. 1. The teeth of the rotor 20 being of magnetic material are employed as the active zones A while the gaps between the teeth are non-magnetic and employed as the passive zones P.

In order that at least one of the proximity signal generators will be producing an output signal when the shaft 16 is at rest, the arrangement between the rotor 20 and the pickups is such that in any given angular position of the rotor at least one of the pickups will be exposed to an active zone A. One way of effecting this is illustrated in FIG. 1 wherein pickups 22 and 24 are 90° apart around the axis of rotor 20, and the angular segment of rotor 20 through which the passive zone P extends is equal to 90° minus the amount required to have both pickups exposed to an active zone A in the position shown. Since in the example shown the width of a pickup is about 10°, the active areas A are each (in a two-toothed rotor) 100° long while the passive areas P extend through an angle of 80°. The following generalization will hold for a system with two pickups, regardless of the number of uniformly spaced active areas A. If the pickups are so angularly disposed around the rotor axis that when the trailing edge of one pickup is aligned with the leading edge of an active zone A, the leading edge of the other pickup is aligned with the trailing edge of an active zone A, at least one pickup will be exposed to an active zone A in any position of the shaft.

The "leading edges" of a pickup and a rotor tooth are the first to meet edges of the pickup and tooth as the tooth approaches the pickup in the normal direction of rotation. The "trailing edge" of each element is opposite to its leading edge.

In FIG. 1 the alternating active A and passive P zones are disposed around one path of revolution of the rotor 20 and the pickups 22 and 24 are aligned with this path so that each pickup scans the successive A and P zones as the rotor turns. In FIG. 3 the same result is obtained with a detachable rotatable means 20' constituted by two rotors 20A and 20B which detachable means has disposed in successive order alternating active A and passive P zones around each of two paths of revolution and a pickup is aligned with each path of revolution. Each of the rotors in this figure has one active area A and one passive area P, and one pickup is just inside the leading edge of the active zone area A of one rotor at the same time that the other pickup is just inside the trailing edge of the active area A of the second rotor.

As hereinbefore mentioned, FIGS. 4 and 5 show different examples of proximity detection systems which may be employed in place of each of detection systems 21 and 23 in the circuit of FIG. 1.

The proximity detection system shown in FIG. 4 is shown and described in U.S. Patent No. 3,027,467, issued to K. Lipman. Since its operation is fully described in that patient, it will be discussed only briefly herein. In the example of FIG. 4, the pickup and balance elements are two halves of a transducer bridge which is unbalanced when the pickup is not exposed to magnetic material but which is effected by a balance when the pickup is exposed to magnetic material. In the proximity detection system of FIG. 4 the transducer bridge 30 produces a particular phase of signal when the pickup is exposed to a magnetic material such as the active zone A of rotor 20, which signal is amplified by amplifier 34 and detected by the phase sensitive detector 36, thereby to operate the flip-flop 38 to produce an output signal which is the speed function signal SF when the system of FIG. 4 is employed in the circuit of FIG. 1. The curves in FIG. 2 are representative of the output of the proximity detection system shown in FIG. 4. Thus the system of FIG. 4 may be employed for each of the proximity detection systems 21 and 23 of FIG. 1. A more detailed description of the circuit and operation of the system of FIG. 4 will be found in the aforesaid U.S. Patent 3,027,467.

In FIG. 5 there is shown another example of proximity detection system which may be used for each of the proximity detection systems 21 and 23 of FIG. 1. The curves in FIG. 2 are representative of the output SF of the system in FIG. 5. The proximity detection system of FIG. 5 is fully shown and described in U.S. Reissue Patent No. 24,779 and U.S. Patent No. 3,005,110, both to David L. Elam, and therefore will be only briefly described herein. The windings of a pickup 40 and the distributed capacity of the pickup leads and the rest of the system, form the tuned circuit of a triode oscillator 42 whose output is amplified by a triode amplifier 44, which is further amplified by an amplifier 46. The output of amplifier 46 is coupled through a capacitor 48 and a half wave rectifier 50 to the grid of an output amplifier 52, the rectifier 50 being so poled that the rectified amplified output of the oscillator 42 is applied as a negative signal to the input of amplifier 52 thus operating as a hold-off bias on this amplifier as long as the oscillator 42 is oscillating. Thus amplifier 52, which is normally biased on for full output, is cut off by the hold-off bias as long as the oscillator 42 is oscillating. When the oscillator 42 stops oscillating, the hold off bias through rectifier 50 is removed from the amplifier 52, whereupon this amplifier conducts fully to produce an output across its cathode output resistor 54.

When the proximity detection system of FIG. 5 is employed in FIG. 1, the toothed rotor 20 need only to be made of current-conductive material. Under normal conditions, that is when the pickup 40 is not exposed to a conductive object, oscillator 42 oscillates continuously and the output thereof is amplified by the amplifiers 44 and 46, and applied through rectifier 50 as a negative hold-off bias to the amplifier 52 to cut off this amplifier. However, when the pickup 40 is exposed to conductive material (active zone A), eddy current losses occurring therein serve to damp or squelch the oscillations in the oscillator 42, removing the hold-off bias from the amplifier 52 and permitting full current flow therethrough. The resulting voltage across cathode resistor 54 is the speed function signal SF when the system of FIG. 5 is employed for each of the proximity detection systems 21 and 23 in the system of FIG. 1. As soon as the conductive object (active zone A) is removed from the field of the pickup coil 40 that is when the pickup is exposed to the inactive zone A (air gap between the teeth of rotor 20, FIG. 1), oscillations resume in the oscillator 42 and the output amplifier 52 is again cut off.

Referring again to FIG. 1 the electric output signal SF of each proximity signal generator (PG1 and PG2) is stabilized or rendered constant in magnitude, for example by passing it through an electric limiter which insures that the output signal SF will be of uniform magnitude to add validity to the later described integration thereof. More specifically the output of signal generator PG1 is coupled to the input of a limiter L1, while the output of signal generator PG2 is coupled to the input of a limiter L2. It will be appreciated that if the proximity signal generators PG1 and PG2 are of such nature that their output signals are of uniform magnitude for example by having output limiter built-in, the additional limiters L1 and L2 would be unnecessary.

The stabilized electric speed function signal SF from the output of each of the proximity detection systems 21 and 23 is integrated by an electrical integrator connected to the output of the limiter. More particularly the input of an integrator IG1 is connected to the output of limiter L1, while the input of an integrator IG2 is connected to the output of limiter L2. Each of the integrators produces what may be conveniently termed an electric integral output signal IS which is proportional to the integral of the stabilized speed function signal SF applied to its input.

Each limiter may be as shown at L2 wherein a voltage threshold device, such as a Zener diode 60, connected across the output line from the signal generator PG2 is associated with a dropping resistor 62 in series with the line.

The electric integrators may be of the configuration shown in detail at IG2 which includes a series input resistor 64, a capacitor 66 across the line and a load resistor 68 to provide an output voltage. Although the time constant of the integrator is determined primarily by the resistor 64 and the capacitor 66, the shunt effect of load resistor 68 across the capacitor 66 must also be taken into consideration.

The components of each integrator (IG1 and IG2) are chosen to provide a time constant that is so long compared to the dwell time of the signals SF, that the integrator is unable to build up an output signal IS of at least a predetermined magnitude sufficient to drive the following utilization circuit (RE1 and RE2) while shaft 16 is rotating above a predetermined low order value of speed for example one half r.p.m. However, the time constant of the integrator is made short enough relative to the dwell times of signals SF so as to produce an electric output signal IS at least as great as the predetermined minimum threshold value of the following utilization circuit when the speed of shaft 16 drops to the predetermined low order value of speed such as the example of one half r.p.m. With such an arrangement the integrator output signal IS increases as the speed of the turbine shaft 16 decreases.

The utilization circuits RE1 and RE2 coupled to the outputs of integrators IG1 and IG2 respectively, may be for example voltage sensitive relays which require at least a predetermined minimum threshold voltage to operate. By way of example, a voltage sensitive relay may take the form shown in detail at RE2, wherein a thyristor (semiconductor controlled rectifier) 70 fires only when the voltage applied to its gate cathode junction reaches a predetermined minimum threshold value.

The main current path of thyristor 70 is in series with a diode 72, the operating winding 74 of a relay 76, and a suitable source of electric power such as the secondary 78 of a transformer 80 whose primary 82 is connected to a source of AC through an interlock switch 84. At normal operating speeds of the turbine rotor, the interlock switch 84 is open, and it closes automatically at speeds below for example 600 r.p.m. by means not shown. A filter condenser 86 is shunted across relay winding 74. Relay 76 includes a set of normally open contacts K2 which are closed when the relay is operated by energizing winding 74. The corresponding set of normally opened relay contacts for the voltage sensitive relay RE1 is shown at K1, it being understood that apparatus for the operation thereof corresponds to that shown for voltage sensitive relay RE2. The input control circuit to thyristor 70 includes a customary current limit resistor 88 and a diode 90 for the protection of the control junction of the thyristor 70. Diode 72 helps protect the thyristor against surges in output voltage. Surges will divide between the diode and the thyristor, thus effectively increasing the maximum rating of the thyristor. Diode 90 protects the thyristor from being damaged by reverse voltage applied to the gate electrode.

The operating theshold level of each of the voltage sensitive relays RE1 and RE2 is above the value of the integral signal IS which the preceding integrator can produce while the speed of the turbine rotor is above the desired predetermined low order value, for example one half r.p.m. Thus, for speeds above the exemplary one half r.p.m. relay contacts K1 and K2 will remain normally open. However, when the turbine rotor speed drops to the desired low order value, such as the example one half r.p.m., the integrator output signals IS will be of sufficient magnitude to operate the voltage sensitive relays RE1 and RE2.

When either set of contacts K1 or K2 is closed, power is supplied from a source such as the battery 94 to a power solenoid 96, which when energized pulls a gear engaging lever 98 from the disengaged positon shown in FIG. 1 to an engaged position with respect to the turning gear 14, an idling gear 100 rotatably carried at one end of lever 98, and a driving gear 102 keyed to the output shaft of motor 12. Lever 98 is pivoted at a point intermediate its opposite ends around an axis coaxial with the motor output shaft whereby idling gear 100 is always engaged with driving gear 102 regardless of the position of lever 98. The operating circuit of motor 12 includes a source of power 104 and a normally open limit switch 106 which is engaged and closed by lever 98 after gear 100 has meshed with gear 14. When energized, solenoid 96 operates a set of normally open contacts 108 to close a holding circuit which may be released by opening a reset switch 110.

The purpose of the system shown in FIG. 1 is to couple the motor 12 to the turning gear 14 only at a safe speed, that is a slow enough speed to allow the gears to be meshed without damage thereto. The safe speed depends on the particular mechanical system involved. In some systems the gears may be engaged safely at one half r.p.m.; in others at one r.p.m.; etc. Some systems will allow a safe gear engagement at 8 r.p.m. and even higher. Since the normal operating speed of a turbine may be in the order of 3600 r.p.m. the safe gear engaging speed whether it be one half r.p.m. or eight r.p.m. is conveniently and logically referred to as "substantially zero speed" or a "predetermined low order speed value relative to normal operating speeds," with the understanding that these terms may also include zero speed or the shaft at rest.

In an example of the arrangement shown, with a two-toothed rotor 20, and for a safe gear engaging speed of one half r.p.m., the time constant for each of the integrators IG1 and IG2 was chosen at approximately 30 seconds with such compensation or adjustment as is necessary to compensate for the fact that the active zones A are occupied by a greater angular segment than the passive zones P.

In a particular example of FIG. 1, employing a two-toothed rotor 20 and approximately a 30-second time constant in each integrator, for producing an operating signal when a turbine shaft which normally operates at 3600 r.p.m. drops to ½ r.p.m., the parameters of certain components of the system may be as follows:

| | | |
|---|---|---|
| Resistor 62 | ohms | 1000 |
| Resistor 64 | do | 36000 |
| Resistor 68 | do | 36500 |
| Resistor 83 | do | 22000 |
| Condenser 66 | µf | 500 |
| Condenser 86 | µf | 50 |

Output SF of prox. gen.:
| | | |
|---|---|---|
| Exposed to active Zone A | volts D.C | 10 |
| Exposed to passive Zone P | volts | Zero or minus |
| Zener diode 60 | volts | 9.1 |
| Secondary 78 | volts A.C | 25 |
| Integral signal IS above ½ r.p.m. | volts | <.5 |
| Integral signal IS at or below ½ r.p.m. | volts | >.5 |
| Relays RE1–RE2 input response threshold | do | .5 |

While it is realized that various latching and interlock circuits other than those shown may be desirable in turning gear control systems, such additional components are not shown since they form no part of the invention and their use and configuration are well known to those skilled in the art.

Although the rotor 20 is shown with two teeth, the invention is not restricted to the use of a rotor with only two teeth. Also more than two pickups and associated systems may be employed if desired.

It should also be understood that the invention is not restricted to the use of teeth of a tooth rotor as the active areas A, and the gaps or spaces between the teeth as the passive areas P. For example the functions of the teeth and spaces of a tooth rotor may be reversed by employing the teeth as the passive zones P, and the gaps or spaces between the teeth as the active zones A. This may be accomplished for example, by using the proximity detection system of FIG. 5 with slight modification in the sys- of FIG. 1. By reversing the direction of diode 50 the proximity signal generator of FIG. 5 will produce an electric speed function signal SF whenever the oscillator 42 is ocillating, which it does in response to the pickup 40 being exposed to spaces or gaps between the teeth of the rotor 20, which for this example are the active areas A.

When the pickup 40 is exposed to a passive area P (rotor tooth) oscillator 42 stops oscillating to remove the forward bias applied through rectifier 50 thus cutting off the amplifier 52. The same relations between the pickups and active areas A heretofore outlined must be observed to insure that at least one of the proximity detection systems will be supplying an output signal SF when the shaft 16 is at rest.

From the foregoing description it will be apparent that the invention provides a relatively simple and economical all electric zero speed system.

It is to be understood that the herein described arrangements are simply illustrative of the principles of the invention, and that other embodiments and applications are within the spirit and scope of the invention.

What is claimed is:

1. Apparatus for providing a specific response when the rotating speed of a rotatable device drops to a predetermined low order value relative to normal operating speed, said apparatus comprising first and second electrical speed function signal generating means each for producing in response to rotation of said device intermittent electric speed function signals whose dwell times increase as the rotating speed of the device decreases, at least one of said signal generating means producing a speed function signal at any given angular position of said device, an electric computing circuit coupled to each speed function signal generating means for integrating the speed function signal output of the generating means to produce a computed electric signal proportional to the integral of the speed function signal output of its associated speed function signal generator, each of said computing circuits having a time constant which is so long relative to the rotation speed of said device that said computed signal cannot attain at least a predetermined minimum value when said device is rotating above said low order value, said time constant being sufficiently short so that said computed signal attains at least said predetermined minimum value when the rotational speed of said device drops to said low order value, and utilization means coupled to said computing circuits for providing a specific reaction in response to said computed signals only when they are of at least said predetermined minimum value.

2. Apparatus for providing a specific response when the rotative speed of a rotating device drops to a predetermined low order value relative to normal operating speed, said apparatus comprising detectable means rotatable with said device, first and second electric proximity signal generators, the first proximity signal generator successively alternating between ON and OFF conditions in response to successive angular segments of the detectable means passing a fixed point during each revolution of the detectable means, the first generator being ON while a particular one of said segments is passing the fixed point and OFF while the segment following the particular one is passing the fixed point, the second proximity generator successively alternating between ON and OFF conditions in response to successive angular segments of the detectable means passing a stationary point during each revolution of the device, the second generator being ON while a certain one of said segments is passing the stationary point, and OFF while the segment following the certain one is passing the stationary point, each of said proximity generators producing a particular electric output signal as long as it is in the ON condition and being ineffective to produce said particular output signal in its OFF condition, said detectable means and said proximity signal generator means being so arranged that when said detectable means is not rotating at least one of said generators will be in the ON condition, an electrical integrator coupled to each proximity signal generator for integrating said particular signal output of that generator to produce an electric integral output signal, each of said integrators having a time constant which is so long relative to the rotation speed of said device that said integral signal cannot attain at least a predetermined minimum value when said device is rotating above said predetermined low order value, said time constant being short enough so that said integral signal attains at least said predetermined minimum value when the rotational speed of said device drops to substantially zero speed, and electric utilization means having input means coupled to the outputs of said integrators for providing a specific reaction only in response to input signals thereto of at least said predetermined minimum value.

3. Apparatus for providing a specific response when the speed of a rotating device drops to substantially zero speed, said apparatus comprising detectable means coupled to and rotatable with said device, the rotation of said detectable means being about a predetermined axis, said detectable means having respective active and passive zones alternately disposed around at least one path of revolution around said axis, a plurality of pickups so arranged that each is alternately exposed to active and passive zones during each revolution of said detectable means, there being at least one pickup exposed to an active zone at any given angular position of the detectable means, a plurality of electric proximity detection systems, each associated with and including a different one of said pickups, each proximity detection system having an output circuit and also being responsive to its associated pickup being exposed to an active zone to produce an electric output signal which subsists as long as the pickup is exposed to an active zone, an electric computing system coupled to the output circuit of each of said proximity detection systems for producing an electric integral output signal proportional to the integral of the output of that proximity detection system with respect to time, the time constant of each said computing system being too long to allow the computing system to produce at least a predetermined minimum value integral output signal when said device is rotating above substantially zero speed, said time constant being short enough to allow the computing system to produce an integral output signal of at least said predetermined minimum value when the rotational speed of said device drops to substantially zero speed, utilization means having input means coupled to the outputs of all said computing systems and which reacts in a specific manner only in response to input signals above said predetermined minimum value, whereby said utilization means reacts in said specific manner only when the speed of said device drops to substantially zero speed.

4. Apparatus for providing a specific response when the speed of a rotating device drops to a predetermined low order value relative to normal operating speed, said low order value being at or near zero speed, said apparatus comprising detectable means coupled to and rotatable with said device, the rotation of said detectable means being about a predetermined axis, said detectable means having respective active and passive zones alternately disposed around at least one path of revolution around said axis, a plurality of impedance type pickups so arranged that each is alternately exposed to active and passive zones during each revolution of said detectable means, there being at least one pickup exposed to an active zone at any given angular position of the detectable means, said pickups sensing said active zones by responsive impedance change, a plurality of electric proximity detection systems, each associated with and including a different one of said pickups, each proximity detection system having an output circuit and also being responsive to impedance change of its associated pickup upon exposure to an active zone to produce an electric output signal which subsists as long as the pickup is exposed to an active zone, an electric integrator coupled to the output circuit of each of said proximity detection systems for producing an electric integral output signal proportional to the integral of the output of that proximity detection system with respect to time, the time constant of each said integrators being too long to allow the computing system to produce at least a predetermined minimum value integral output signal when said device is rotating above said predetermined low order value of speed, said time constant being sufficiently short to allow the integrator to produce an integral output signal of at least said predetermined minimum value when the rotational speed of said device drops below said predetermined low order value, utilization means coupled to all said computing systems and which reacts in a specific manner only in response to input signals above said predetermined minimum value, whereby said utilization means reacts in said specific manner only when the speed of said device is below said predetermined low order value.

5. The combination as in claim 4 wherein said pickups are inductance type pickups and said active zones are one of magnetic and non-magnetic and said passive zones are the other of magnetic and non-magnetic, whereby an active zone is sensed by causing inductive change in a pickup exposed thereto, and each proximity detection system is responsive to inductance change of its associated pickup upon exposure to an active zone to produce an electric output signal which subsists so long as the pickup is exposed to an active zone.

6. The combination as in claim 4 wherein said pickups are inductance type pickups and said active zones are one of conductive material and non-conductive material and said passive zones are the other of conductive material and non-conductive material, whereby an active zone is sensed by causing impedance change in a pickup exposed thereto, and each proximity detection system is responsive to impedance change of its associated pickup upon exposure to an active zone to produce an electric output signal which subsists so long as the pickup is exposed to an active zone.

7. Apparatus for coupling a drive motor to a turning gear on a turbine rotor shaft when the rotating speed of the shaft drops to a predetermined low order value relative to normal operating speed, said apparatus comprising first and second electrical speed function signal generating means each for producing in response to rotation of said shaft intermittent electric speed function signals whose dwell times increase as the rotating speed of the shaft decreases, at least one of said signal generating means producing a speed function signal at any given angular position of said shaft, an electric computing circuit coupled to each speed function signal generating means for integrating the speed function signal output of the generating means to produce a computed electric signal proportional to the integral of the speed function signal output of its associated speed function signal generator, each of said computing circuits having a time constant which is so long relative to the rotation speed of said shaft that said computed signal cannot attain at least a predetermined minimum value when said shaft is rotating above said low order value, said time constant being sufficiently short so that said computed signal attains at least said predetermined minimum value when the rotational speed of said shaft drops to said low order value, and means coupled to said computing circuits for coupling said drive motor to said turning gear in response to said computed signals only when they are of at least said predetermined minimum value.

References Cited
UNITED STATES PATENTS

| | | | |
|---|---|---|---|
| 2,877,456 | 3/1959 | Benowitz | 340—271 |
| 2,989,678 | 6/1961 | Swartout | 318—461 |
| 2,993,147 | 7/1961 | Wright, Jr. et al. | 317—5 X |
| 3,123,818 | 3/1964 | Steele. | |
| 3,264,496 | 8/1966 | Scholl | 317—5 X |

LEE T. HIX, *Primary Examiner.*